No. 664,908. Patented Jan. 1, 1901.
J. A. SWINEHART.
MACHINE FOR PLACING CROSS WIRES IN SOLID RUBBER TIRES.
(Application filed Jan. 6, 1900.)
(No Model.) 3 Sheets—Sheet 1.

Witnesses:

Inventor:
James A. Swinehart,
by Humphrey & Humphrey,
Attys.

No. 664,908. Patented Jan. 1, 1901.
J. A. SWINEHART.
MACHINE FOR PLACING CROSS WIRES IN SOLID RUBBER TIRES.
(Application filed Jan. 6, 1900.)
(No Model.) 3 Sheets—Sheet 2.

Witnesses: Inventor:
James A. Swinehart,
by Humphrey & Humphrey,
Attys.

No. 664,908. Patented Jan. 1, 1901.
J. A. SWINEHART.
MACHINE FOR PLACING CROSS WIRES IN SOLID RUBBER TIRES.
(Application filed Jan. 6, 1900.)
(No Model.) 3 Sheets—Sheet 3.

Witnesses:

Inventor:
James A. Swinehart,
by Humphrey & Humphrey,
Attys

UNITED STATES PATENT OFFICE.

JAMES A. SWINEHART, OF AKRON, OHIO, ASSIGNOR TO THE FIRESTONE TIRE AND RUBBER COMPANY, OF SAME PLACE.

MACHINE FOR PLACING CROSS-WIRES IN SOLID RUBBER TIRES.

SPECIFICATION forming part of Letters Patent No. 664,908, dated January 1, 1901.

Application filed January 6, 1900. Serial No. 622. (No model.)

*To all whom it may concern:*

Be it known that I, JAMES A. SWINEHART, a citizen of the United States, residing at Akron, in the county of Summit and State of Ohio, have invented a certain new and useful Improvement in Machines for Placing Cross-Wires in Solid Rubber Tires, of which the following is a specification.

My invention has relation to improvements in mechanism for the manufacture of solid rubber vehicle-tires, and has especial relation to devices for putting cross wires or bars in the base of tires constructed in accordance with the invention described in United States Letters Patent No. 624,992, granted to me May 16, 1899.

The object of my invention is to feed forward the tire before vulcanization by a step-by-step movement and to successively perforate the base of the tire, feed the wires or bars singly to the driving device, and insert them severally in the perforations by mechanism so constructed and arranged that the different parts shall simultaneously coact to effect these different steps.

To the aforesaid object my invention consists in the peculiar and novel construction, arrangement, and combination of parts hereinafter described and then specifically pointed out in the claims, reference being had to the accompanying drawings, forming a part of this specification.

Figure 1:
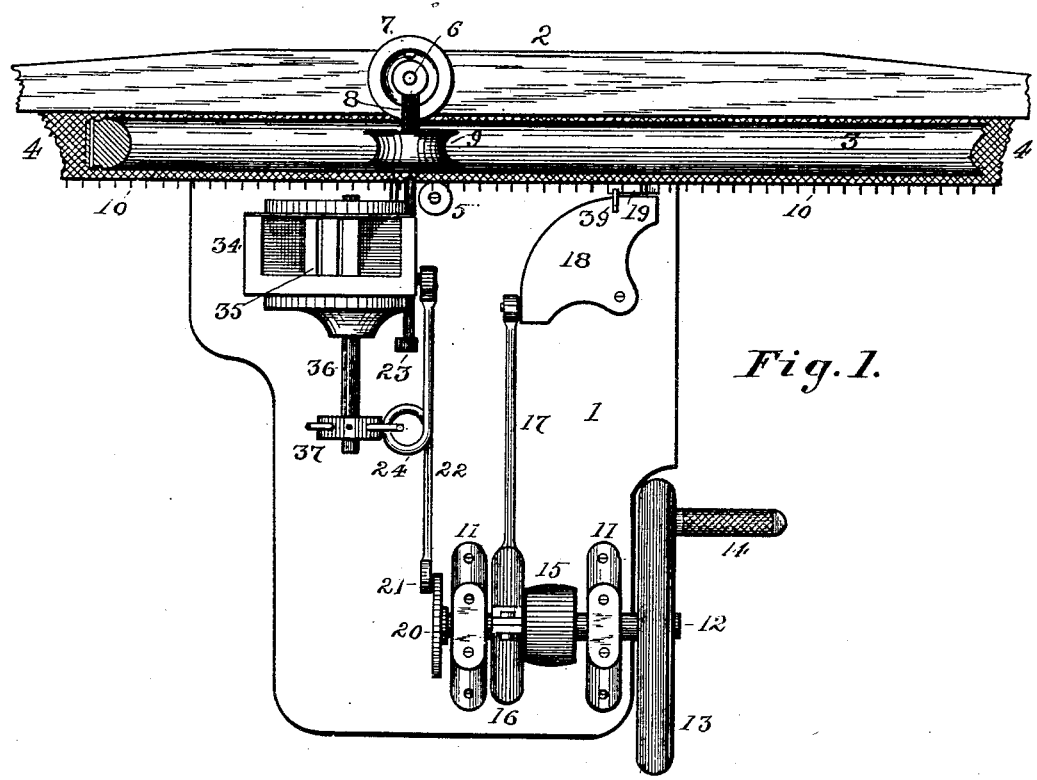
Figure 2:
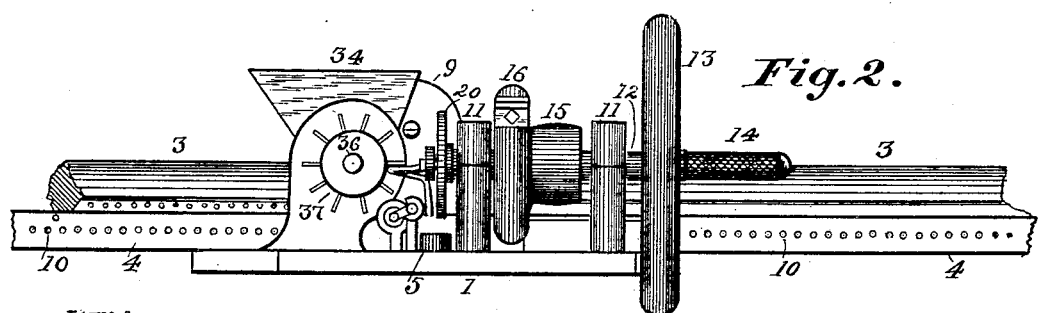
Figure 3:
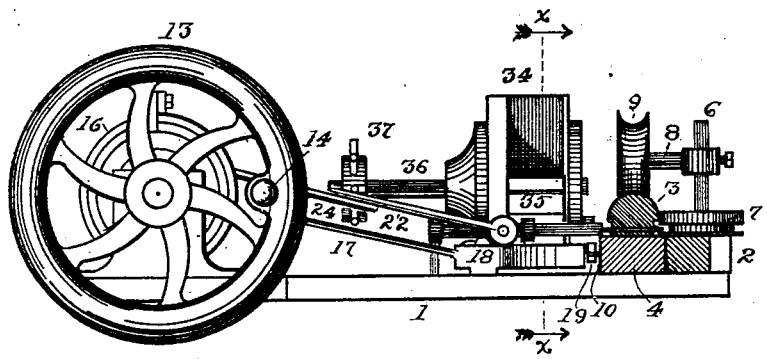
Figures 4, 5, 6:
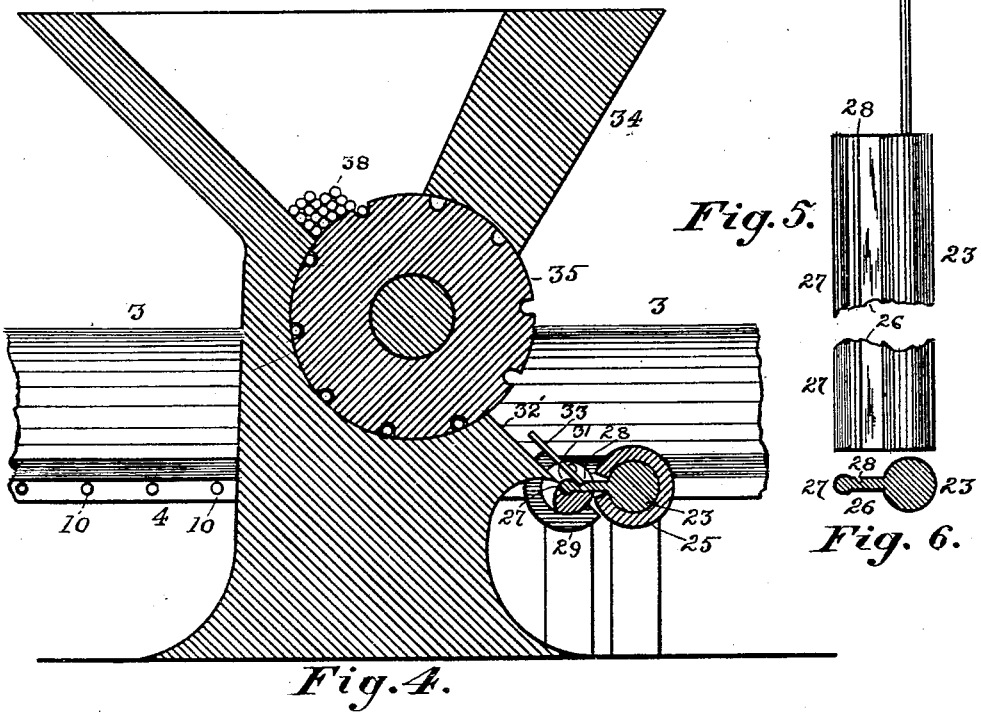
Figures 7, 8, 9:
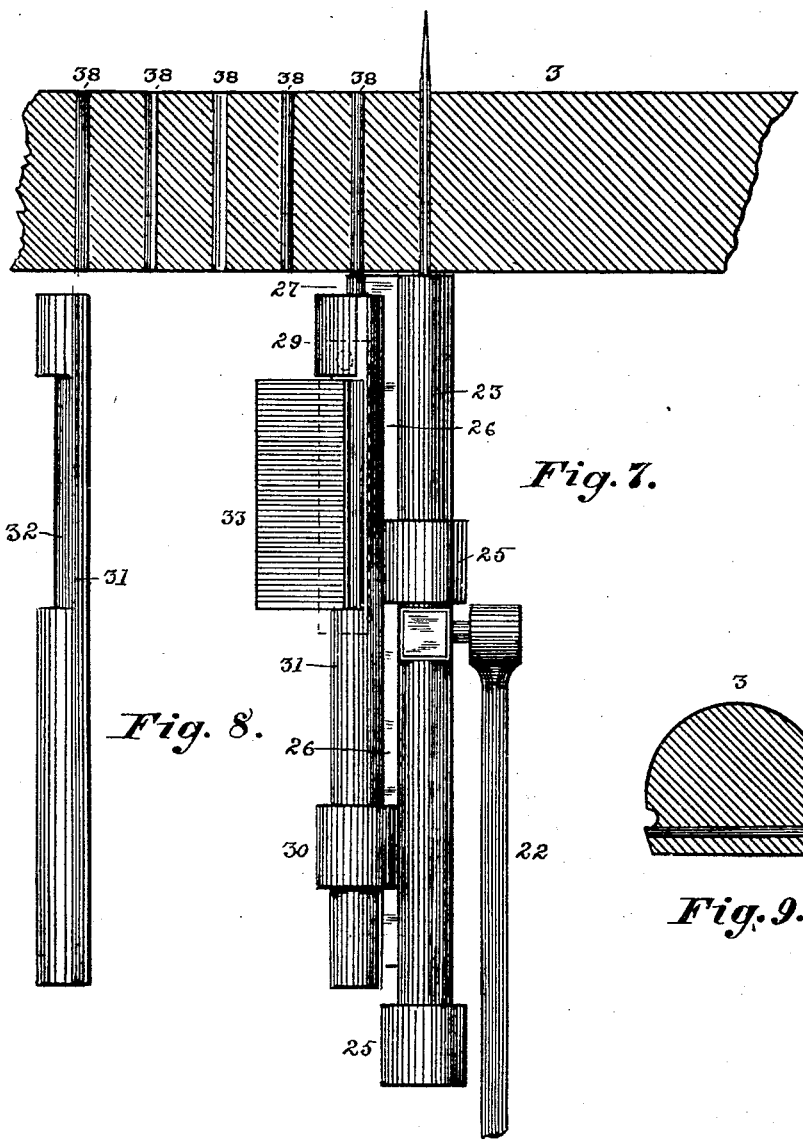

In the accompanying drawings, in which similar reference-numerals indicate like parts in the different views, Figure 1 is a plan of the machine; Fig. 2, an elevation looking from the bottom of Fig. 1; Fig. 3, an elevation looking from the right of Fig. 1; Fig. 4, an enlarged view in section at the line *x x* of Fig. 3, showing cross-wires resting in the hopper; Fig. 5, an enlarged view of the needle-shaft, needle, and hammer intermediately broken to shorten the view; Fig. 6, a section of Fig. 5; Fig. 7, a plan, enlarged, of the needle-shaft, needle, wire-guide and connected parts, with a portion of a tire in section to illustrate the operation; Fig. 8, a plan of the wire-guide detached, and Fig. 9 a section of the completed tire with the bar or wire inserted.

Referring to the figures, 1 is the table or base that supports the operative mechanism, resting on and across one end of which is a bar of wood 2, having a straight edge toward the mechanism and securely attached to the table. The tire 3 is placed on a movable board 4, having its upper face covered with canvas or duck to form a frictional contact with the tire, and this board is adapted to slide across the table against the bar 2, being held in place by a roller or small pulley 5, mounted on a stud on the table 1. In the bar 2 is firmly secured a short shaft 6, on which freely revolves a wheel 7 of such size as to rest against the tire as it passes, and thus form an abutment to the thrust of the needle, and with a groove in its face to prevent its encountering the point of the needle. On the top of the shaft 6 is adjustably mounted a horizontal wrist 8, bearing at its outer end a freely-running grooved pulley 9, having its groove of suitable configuration to fit the top of the tire. The edge of the board 4 opposite the bar 2 is provided at regular intervals with projecting pins 10, so located as to run above the roller 5. At the opposite end of the table 1 there is mounted in suitable bearings 11 11 a shaft 12, bearing at its outer end a balance-wheel 13 with a handle 14, so that it may be operated by hand, and between the bearings a pulley 15 to receive a belt, where it is desired to drive it by power from some other machinery. On the shaft 12 is an eccentric 16, from the strap of which a connecting-rod 17 extends and is provided with a pivotal bearing connecting it with a movable quadrant 18, pivotally connected with the table 1. The edge of this quadrant is arranged to move close to the ends of the pins 10 and bears a catch 19, arranged to pass the pins as it moves to the right in Fig. 1 and to engage one of said pins in its return stroke, thereby moving the board 4, with the tire thereon, a ⸺ained distance to the left. This catch is ⸺d in engagement by a spring 39. On the inner end of the shaft 12 is a disk 20, bearing a wrist-pin 21, on which is pivotally connected one end of a connecting-rod 22, the other end of which is attached to the needle-shaft 23. This connecting-rod 22 is intermediately coiled a single turn at 24 for a purpose to be stated. The needle-shaft 23 slides in fixed guides 25 and has extending from one side a thin plate or web 26, having at its outer end a round bead 27, that constitutes the hammer to drive the wires into the tire, and in the top of the web a narrow groove 28, as shown in Figs. 4, 5, and 6.

Rigidly secured to the table by supports 29 30 is the wire-guide 31 adjacent to and parallel with the needle-shaft. This guide (shown in section in Fig. 4 and in elevation in Figs. 7 and 8) consists of a round bar deeply grooved longitudinally on one side to form a channeled course for the hammer 27 to move in and at the point 32 in Fig. 8 is beveled from below, so as to form a seat for the spout 32' of the hopper, hereinafter to be described. Directly above this seat and with sufficient space between to permit the wires 38 from the hopper to enter singly is secured a plate 33, the object of which is to prevent the wires 38 in their descent from the hopper getting outside of the groove in the guide 31. The lower edge of this plate fits in the groove 28 in the web 26, heretofore referred to. This plate 33 forms the top and the beveled portion of the hopper-frame 34 at the point 32' forms the bottom of a spout by which the wires are fed to the channeled course, hereinbefore referred to, in the wire-guide 31. The wires 38 to be forced into the tire being of proper size are placed in the hopper 34, fitted and arranged to turn in the bottom of which is a solid cylinder 35, having grooves in its periphery to receive single wires. This cylinder 35 is mounted on a shaft 36, on the outer end of which is a spur-wheel 37, arranged to have one of its points engaged by the coil in the connecting-rod 22 in its return stroke, and thereby given a partial rotation sufficient to permit one of the wires to escape from the cylinder 35.

In operation a tire is placed on the cloth face of the board 4 and the latter passed into its path beside the bar 2 from the right of Fig. 1 and preferably pushed forward until the tire is in position to be engaged by the needle. Power is then applied to the machine, which feeds the board and tire progressively forward. At each rest the needle pierces the tire and at each succeeding rest a wire 38, released from the hopper, falls into the wire-guide 31 and is driven into the hole last made by the needle by the hammer moving in unison with the needle as it makes the next puncture, thus placing these wires with the utmost accuracy of distance and with great rapidity.

I claim as my invention—

1. The combination in a machine of the class designated of a movable platform to carry an unvulcanized tire, with mechanism to embed in said tire at determinate intervals short metallic bars transverse to the longitudinal axis thereof.

2. A machine for embedding short metallic bars in unvulcanized rubber vehicle-tires consisting of a movable platform to carry the tire, mechanism to feed the platform progressively forward, and to embed in said tire at each rest, short metallic bars transverse to the longitudinal axis thereof.

3. The combination in a machine of the class designated of mechanism to move forward at intervals a platform carrying an unvulcanized rubber vehicle-tire, with a puncturing-needle adapted to advance and recede to puncture said tire transverse to its axis and means for operating said needle, substantially as shown.

4. The combination in a machine for embedding cross-wires in rubber vehicle-tires, of a support for the tire adapted to be moved progressively, mechanism for causing such movement, a needle to puncture said tire at determinate intervals, and devices to insert cross-wires in said punctures, substantially as shown and described.

5. In a machine for embedding cross-rods in rubber vehicle-tires, the combination with mechanism for progressively moving a platform to bear the tire, and a reciprocating needle to puncture said tire at determinate intervals, of simultaneously-acting mechanism to embed short metallic rods in said punctures, substantially as shown and described.

6. The combination in a machine of the class designated, of an advancing and a receding needle adapted to transversely puncture a solid rubber vehicle-tire, mechanism to simultaneously carry forward and embed in said tire short transverse bars, and means for causing said tire to pass with a progressive movement in position to be acted on by said needle and embedding mechanism, substantially as shown and described.

7. The combination of a support arranged to bear an unvulcanized rubber tire and mechanism to cause a step-by-step movement of said support in one direction, of a reciprocating puncturing-tool arranged to form openings in said tire transverse to its longitudinal axis, and a successively-acting hammer to force short metallic rods in said openings, substantially as shown and described.

8. The combination of a platform adapted to bear a rubber vehicle-tire, arranged to move transversely to the axillary alinement of a reciprocating needle, adapted, when in motion, to puncture said tire in combination with a reciprocating needle arranged to puncture said tire, and means for causing the respective movements of said platform and needle, substantially as shown and described.

9. In a machine of the class designated, the combination of a platform bearing a rubber vehicle-tire adapted and arranged by suitable mechanism to move transversely to the axillary alinement of a reciprocating needle, a reciprocating needle to puncture said tire at determined intervals, a hammer arranged to move parallel and simultaneously with said needle to successively embed short metallic bars in the punctures made by said needle, substantially as shown and described.

10. In a machine for placing cross-wires in solid rubber tires, the combination with a movable platform to support and carry the tire, and arranged to be moved progressively forward, of a needle to pierce the tire, a wire-guide to direct to said punctures in said tire, a device to feed the wires singly to the guide, and a hammer to drive said wires into the punctures made by said needle, said parts being arranged by suitable mechanism to be simultaneously actuated to successively perform their respective functions, substantially as shown and described.

11. In a machine of the class designated, the combination with a needle to pierce the tire, and a movable board to carry said tire to the needle and means for moving said board progressively forward, of a pulley arranged to rest against said tire opposite said needle having a groove to permit the needle-point to enter substantially as shown and described.

12. In a machine of the class designated the combination with a needle to pierce the tire, a movable board to carry said tire to said needle and means for moving said board progressively forward and a pulley having a groove to rest against said tire opposite said needle of a grooved roller above the course of said needle to hold said tire against vertical motion, substantially as shown and described.

13. In a machine of the class designated, the combination with a device to carry the tire progressively forward, of a reciprocating needle-carrying shaft having a lateral web and a bead connected with the opposite edges of said web to act as a hammer, guides to direct the needle-carrying shaft and a slotted bar to receive the wires and form a course for said hammer, said needle-carrying shaft being arranged to force a needle into said tire and said hammer being arranged to drive a wire into the opening made by said needle and mechanism substantially as shown to operate said shaft and hammer, substantially as shown and described.

14. In a machine of the class designated the combination with a device for progressively carrying the tire forward, a needle-carrying shaft, a needle mounted thereon, to make openings in said tire a shaft to drive wires into said openings and a channeled course for said shaft, of a hopper to hold wires to be inserted in the tire, a channeled cylinder in said hopper arranged to deliver said wires singly to said channeled course and means for causing a partial revolution of said cylinder at each backward stroke of said hammer, substantially as shown and described.

15. In a machine of the class designated, the combination with the tire-carrying board and mechanism for intermittingly moving it, and the needle-carrying shaft and the hammer and its channeled course and the hopper with a grooved cylinder, of a spur-wheel on the shaft of said cylinder a crank to drive said needle-carrying shaft and hammer and a connecting-rod pivotally connected with said crank and needle-shaft having a projection to engage said spur-wheel at each return stroke to cause a partial revolution of said cylinder, substantially as shown and described.

16. In a machine of the class designated, the combination with a device for progressively moving the tire, and the needle-carrying shaft and its operating mechanism the hammer connected and moving in unison therewith of the channeled course for said hammer having a lateral opening to receive wires a spout to deliver wires singly thereto and a plate connected with said channeled course arranged parallel with said spout to direct said wires into the hammer course, substantially as shown and described.

In testimony that I claim the above I hereunto set my hand in the presence of two subscribing witnesses.

JAMES A. SWINEHART.

In presence of—
C. P. HUMPHREY,
C. E. HUMPHREY.